United States Patent [19]
Garrison

[11] Patent Number: 5,305,528
[45] Date of Patent: Apr. 26, 1994

[54] POWER TOOL BRAKING SYSTEM

[75] Inventor: Richard E. Garrison, Fort Mill, S.C.

[73] Assignee: Textron Inc., Providence, R.I.

[21] Appl. No.: 108,776

[22] Filed: Aug. 18, 1993

Related U.S. Application Data

[63] Continuation of Ser. No. 869,959, Apr. 17, 1992, abandoned.

[51] Int. Cl.$^5$ .............................................. B23D 57/02
[52] U.S. Cl. ...................................... 30/216; 30/381; 30/383
[58] Field of Search ................ 30/215, 216, 381, 383; 56/11.3

[56] References Cited

U.S. PATENT DOCUMENTS

| | | | |
|---|---|---|---|
| 2,480,343 | 8/1949 | Sully | 188/166 X |
| 3,228,177 | 1/1966 | Coates | 56/25.4 X |
| 3,361,165 | 1/1968 | Irgens | 143/32 X |
| 3,664,390 | 5/1972 | Mattsson et al. | 143/32 X |
| 3,991,864 | 11/1976 | Muller | 192/105 |
| 4,593,796 | 6/1986 | Farquhar | 30/381 |
| 4,625,406 | 12/1986 | Fushiya et al. | 30/381 |
| 4,635,364 | 1/1987 | Noll | 30/381 |
| 4,683,660 | 8/1987 | Schurr | 30/381 |
| 4,721,193 | 1/1988 | Nagashima | 30/381 |
| 4,753,012 | 6/1988 | Schurr | 30/381 |
| 4,760,685 | 8/1988 | Smith | 56/11.3 |
| 5,101,567 | 4/1992 | Cool | 30/383 |

FOREIGN PATENT DOCUMENTS 2548574  7/1984  France.

Primary Examiner—Richard K. Seidel
Assistant Examiner—Paul M. Heyrana, Sr.
Attorney, Agent, or Firm—Perman & Green

[57] ABSTRACT

A power tool braking system includes a brake movably mounted to a frame of the power tool and a system for automatically moving the brake to a braking position. The brake has a first portion with a braking surface and a second portion. The system for automatically moving the brake to a braking position comprises a throttle of the power tool having a trigger with a section adapted to engage the brake second portion to move the brake to its braking position upon release of the throttle by a user.

15 Claims, 1 Drawing Sheet

POWER TOOL BRAKING SYSTEM

This is a continuation of copending application Ser. No. 07/869,959 filed on Apr. 17, 1992 now abandoned.

BACKGROUND OF THE INVENTION

1. Field Of The Invention

The present invention relates to power tools and, more particularly, to a braking system for a power tool.

2. Prior Art

There are various different types of power tools known in the prior art including hedge trimmers, chain saws, lawn mowers, or any type of power equipment. There are also various different types of systems used as brakes in these power tools. Some of these systems are described in the following U.S. Pat. Nos. 4,760,685; 3,228,177; 2,480,343; 3,361,165; 3,664,390; and 3,991,864. However, these systems are relatively costly to manufacture and assemble and do not provide a direct operational relationship between a throttle of the power tool and the braking system. Therefore, a need has developed for a braking system that can be manufactured and assembled at a relatively inexpensive cost, but which nonetheless can adequately reduce the time for a driven member, such as a hedge trimmer cutter bar, to stop after a throttle has been released.

SUMMARY OF THE INVENTION

The foregoing problems are overcome and other advantages are provided by a new and improved power tool braking system and method of automatically applying a braking force to a driver in a power tool.

In accordance with one embodiment of the present invention, a power tool braking system for use with a power tool is provided. The system comprises a brake, and means for automatically moving the brake to a braking position. The brake is movably mounted to a frame of the power tool and has a first portion with a braking surface and a second portion. The means for automatically moving the brake comprises a throttle on the power tool having means for engaging the brake second portion to move the brake to its braking position upon release of the throttle by a user.

In accordance with another embodiment of the present invention, a power tool brake for use with a power tool is provided. The brake comprises a first section, a second section, and a third section. The first section is located at a first end of the brake and has a curved brake surface. The second section is located at a second end of the brake and has a general groove shaped area. The third section is located between the first and second sections and has a general uniform linear shape such that the third section can longitudinally slide in a channel of a frame of the power tool.

In accordance with another embodiment of the present invention, a hedge trimmer is provided comprising a frame, a motor, a throttle, a cutting blade, a clutch and a brake. The motor is connected to the frame. The throttle is movably connected to the frame and connected to the motor to at least partially control the motor. The cutting blade is movably connected to the frame. The clutch connects the motor to the cutting blade. The brake is movably connected to the frame and has a first end adapted to contact the clutch and thereby cause a braking action between the connection of the motor to the cutting blade. The brake also comprises a second end adapted to be contacted by the throttle, whereby the throttle, when released by a user, can automatically contact and actuate the brake.

In accordance with one method of the present invention, a method of automatically applying a braking force to a driver in a power tool is provided. The method comprises steps of providing the power tool with a throttle for at least partially controlling the driver, the throttle being movably mounted on a frame of the power tool and having a braking engaging section, the power tool further being provided with a brake having a first end adapted to engage a clutch of the driver and a second end adapted to be engaged by the throttle engaging section; and releasing the throttle from an actuated position to a deactuated position, the throttle brake engaging section automatically contacting the brake second end and moving the brake on the frame to a braking position with the brake first end contacting the clutch to apply a frictional braking force to the clutch.

BRIEF DESCRIPTION OF THE DRAWINGS

The foregoing aspects and other features of the invention are explained in the following description, taken in connection with the accompanying drawings, wherein.

DETAILED DESCRIPTION OF THE INVENTION

Figure 1:
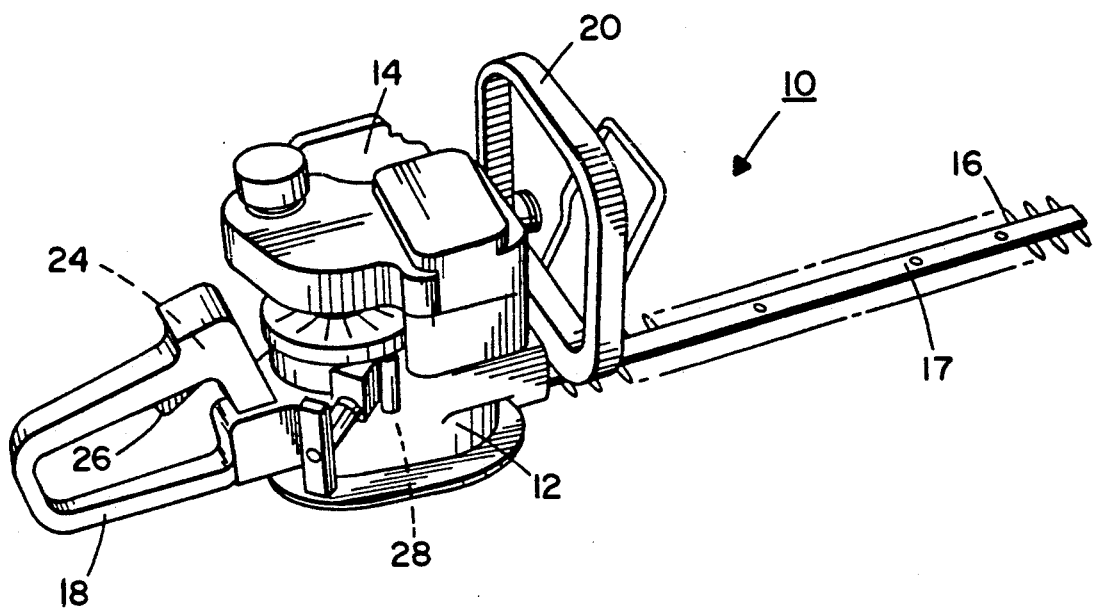
FIG. 1 is a perspective view of a hedge trimmer incorporating features of the present invention.

Referring to FIG. 1, there is shown a perspective view of a hedge trimmer 10 incorporating features of the present invention. Although the present invention will be described with reference to the embodiment shown in the drawings and for use in a hedge trimmer, it should be understood that the present invention could be incorporated into any suitable type of power tool or power equipment and is not limited to use merely in a hedge trimmer and, may be incorporated in different types of embodiments. In addition, any suitable size, shape or type of elements or materials could be used.

Figure 2:
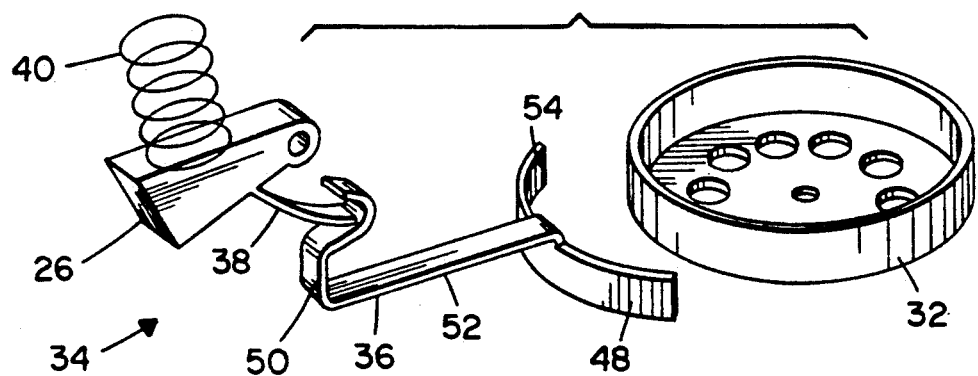
FIG. 2 is a perspective view of elements of the braking system of the present invention.
Figure 3:
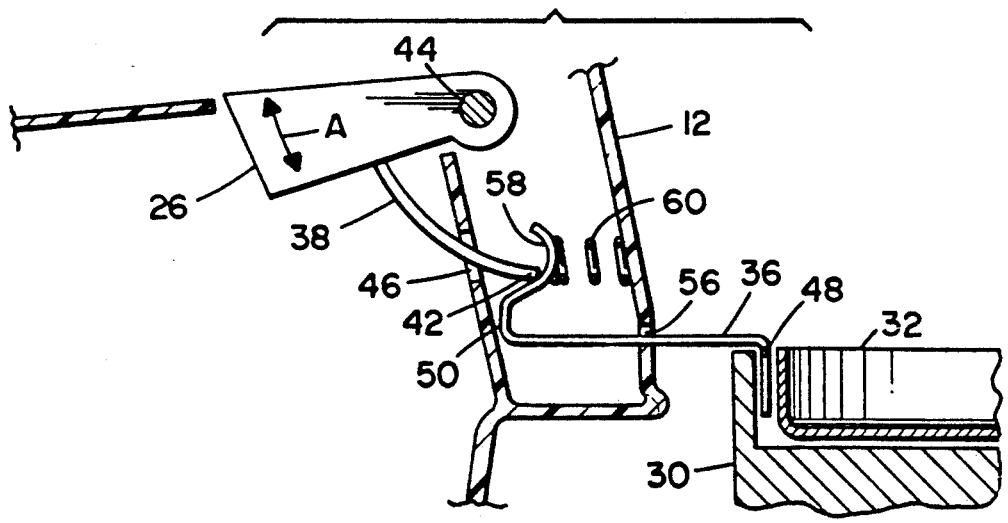
FIG. 3 is a schematic cross-sectional side view of the braking system in FIG. 2 shown in the hedge trimmer of FIG. 1.

The hedge trimmer 10 generally comprises a frame 12, a motor 14 connected to the frame 12, and a cutting blade 16. The frame 12 can be made of metal and/or plastic and includes a rear handle section 18, a front handle 20, and a stationary guide/cutting blade 17. The motor 14, in the embodiment shown, is an internal combustion engine. However, an electric motor could also be provided. The motor 14 is fixedly connected to the frame 12. The trimmer 10 has a throttle 24 located in the frame 12 that has a throttle trigger 26 at the rear handle section 18, and a clutch 28 located in the frame 12 that connects the motor to the cutting blade 16. Referring also to FIGS. 2 and 3, the clutch 28 includes a housing 30 that has a clutch drum 32 movably located therein.

In the embodiment shown, the hedge trimmer 10 includes an improved braking system 34. The system 34 includes a brake member 36 and a finger 38 that extends from the throttle trigger 26. The throttle trigger 26, as is done in the prior art, is generally biased in a home position or low motor speed position. In the embodiment shown, the throttle has a trigger spring 40 to bias the trigger 26 at its home position or deactuated position.

The trigger spring 40 is shown as a coiled spring however, any suitable means to bias the trigger 26 at its low motor speed position can be provided. The finger 38, in the embodiment shown, is integrally formed with the rest of the trigger 26, depends from a bottom surface of the trigger, and has a general curved shape with a bottom tip 42. In a preferred embodiment, the trigger 26 and finger 38 are made from a molded polymer material. However any suitable trigger and finger could be provided including separate members that are attached to each other. The trigger 26 is pivotally attached to the frame 12 by a pin 44. The trigger 26 can be upwardly depressed by a user's finger from its home position to an increased throttle position as shown by arrow A. The throttle trigger finger 38 extends through a hole 46 in the frame 12 and its tip 42 contacts an end of the brake member 36 in the trigger's home position. In an alternate embodiment, any suitable type of means to interconnect the throttle 24 with the brake 36 could be provided and need not be limited to the finger described herein.

The brake 36 has a first section 48 at a first end, a second section 50 at a second end, and a middle section 52 therebetween. The first section 48 extends from a first side of the middle section and the second section 50 extends from an opposite second side of the middle section. The first section 48 has a curved shape with a braking surface 54 that substantially mirrors the outer curve of the clutch drum 32. However, the first section 48 can be provided with any suitable shape and, the braking surface 54 can also be provided with any suitable shape including as a rectangular block. The brake 36 is preferably a single member made of metal, but may be made of a plurality of members connected to each other. In addition, the brake 36 could be made of hard plastic or composite material, or the braking surface 54 could include a permanent or removable brake pad.

The middle section 52, in the embodiment shown, is a straight elongate linear shape and is longitudinally slidably mounted in a channel 56 of the frame 12. However, any suitable means for mounting the brake 36 to the frame 12 could be provided. The second section 50, in the embodiment shown, has a pocket or general groove shaped area 58. This pocket area 58 is adapted to receive the tip 42 of the trigger finger 38 and be pushed thereby. However, any suitable means for the trigger 26 or throttle 24 to move the brake 36 could be provided. In the embodiment shown, the rear surface of the pocket area 58 is contacted by a coiled spring 60. The spring 60 is used to bias the brake 36 away from the clutch drum 32 to a non-braking position while the throttle is actuated by a user. In the embodiment shown, the trigger spring 40 is stronger than the brake spring 60 such that the brake spring 60 can only move the brake away from the clutch drum 32 when the trigger 26 is depressed by a user. However, in alternate embodiments, the brake spring 60 need not be provided or other types of means to bias the brake 36 away from the clutch drum 32 when the trigger 26 is depressed could be provided.

Operation of the system described above is relatively simple. During use of the hedge trimmer 10, with the user depressing the trigger 26, the brake 36 does not interfere with the motion of the clutch drum 32. When the user releases the trigger 26, the trigger spring 40 automatically biases the trigger 26 towards an inactive or released position that causes the throttle 24 to automatically slow down the motor 14 and, the finger 38 moves through hole 46 with its tip 42 pushing on the second section 50 in the pocket area 58. The trigger spring 40 being stronger than the brake spring 60, the finger 38 pushes the brake 36 forward; with the middle section 52 sliding in channel 56. The braking surface 48, thus, contacts the outer surface of the rotating clutch drum 32 and applies a frictional braking force to the clutch drum 32. This frictional force increases the speed at which the cutting blade 16 is stopped. Thus, release of the trigger 26 automatically starts to apply a force to stop movement of the clutch drum 32 and cutting bar 16 independent of the actual speed of the motor 14. Unlike prior art devices that merely use a speed dependent clutch system to stop movement of a driven member based upon the event of a motor's speed being reduced, the present invention can use both its frictional braking system on the clutch drum and a speed dependent clutch system to effect rapid braking of motion to a driven member. Hence, the present invention reduces the time required for the cutting blade 16 to stop after the throttle trigger 26 has been released.

Let it be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

I claim:

1. A power tool comprising a braking system, the braking system comprising:
   a brake movably mounted to a frame of the power tool, the brake being substantially rigid and having a first portion with a braking surface and a second portion; and
   means for automatically moving the brake to a braking position, the means for automatically moving the brake comprising a throttle of the power tool having a trigger with a finger section extending therefrom, wherein the finger section is not directly attached to the brake, but is adapted to push against the brake second portion to move the brake to its braking position upon release of the throttle trigger by a user.

2. A power tool as in claim 1 wherein the brake comprises a single brake member.

3. A power tool as in claim 1 wherein the brake has a middle portion between the first and second portions, the middle portion having a straight elongate linear shape.

4. A power tool as in claim 1 wherein the second portion has a pocket area to receive and be pushed by the throttle trigger finger section.

5. A power tool as in claim 1 wherein the brake is longitudinally slidingly mounted in the frame.

6. A power tool as in claim 1 wherein the throttle includes means to bias the throttle at a released position.

7. A power tool as in claim 1 further comprising means to bias the brake to a non-braking position while the throttle is actuated by a user.

8. A power tool as in claim 1 wherein the frame comprises an aperture for the finger section to project into and move through.

9. A hedge trimmer comprising:
   a frame;
   a motor connected to the frame;

a throttle movably connected to the frame and connected to the motor to at least partially control the motor, the throttle including a trigger with a finger section extending therefrom;

a cutting blade movably connected to the frame;

a clutch connecting the motor to the cutting blade; and a brake movably connected to the frame, the brake having a first end adapted to contact the clutch and thereby cause a braking action between the connection of the motor to the cutting blade, and a second end adapted to be directly contacted by the finger section of the throttle trigger, wherein the finger section is not directly attached to the brake, but is adapted to push against the brake, whereby the throttle trigger, when released by a user, can automatically directly contact and actuate the brake.

10. A hedge trimmer as in claim 9 wherein the throttle has means to bias the trigger at an inactive position.

11. A hedge trimmer as in claim 10 wherein the finger section contacts and actuates the brake when the trigger is at its inactive position and, the finger section moves away from the brake when the trigger is depressed by a user.

12. A hedge trimmer as in claim 9 wherein the finger section is curved.

13. A hedge trimmer as in claim 9 wherein the trigger and finger section are integrally formed of a polymer material.

14. A hedge trimmer as in claim 9 wherein the trigger is pivotally attached to the frame.

15. A method of automatically applying a braking force to a driver in a power tool, the method comprising steps of:

providing the power tool with a throttle for at least partially controlling the driver, the throttle having a trigger movably mounted on a frame of the power tool, the trigger having an integrally formed rigid brake engaging section, the power tool further being provided with a rigid brake having a first end adapted to engage a clutch of the driver and a second end adapted to be engaged by the brake engaging section, the brake engaging section extending from the trigger and being adapted to push against the brake second end, but not being directly attached to the brake; and releasing the throttle trigger from an actuated position to a deactuated position, wherein the brake engaging section of the trigger automatically directly contacts the brake second end and pushes the brake on the frame to a braking position with the brake first end contacting the clutch to apply a frictional braking force to the clutch.

* * * * *